T. J. KING.
TRUCK FOR COTTON PICKERS.
APPLICATION FILED JAN. 21, 1915.
1,166,463.
Patented Jan. 4, 1916.
2 SHEETS—SHEET 1.
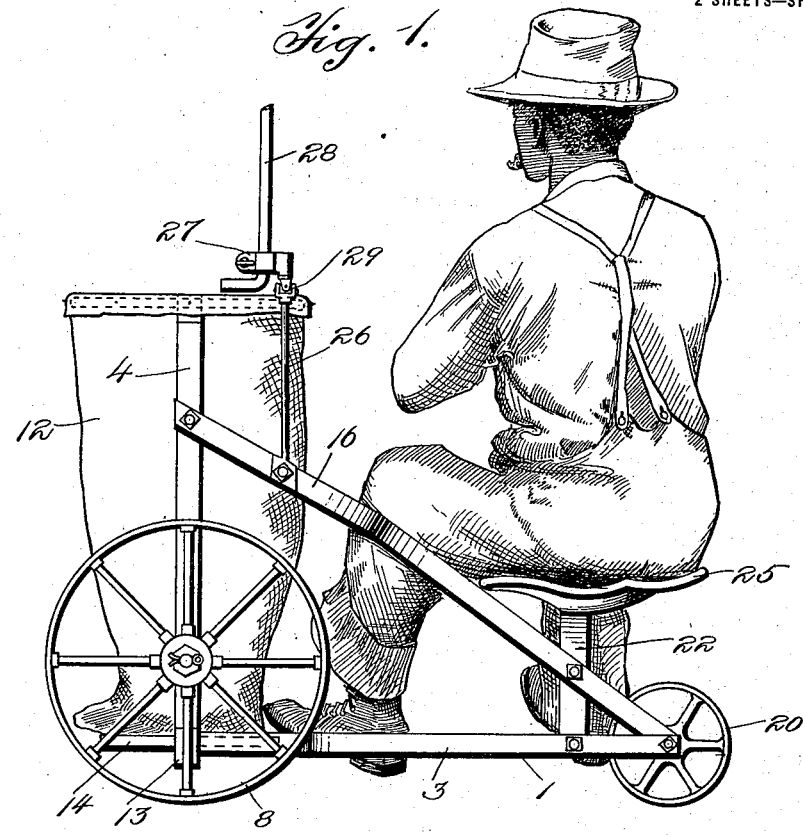
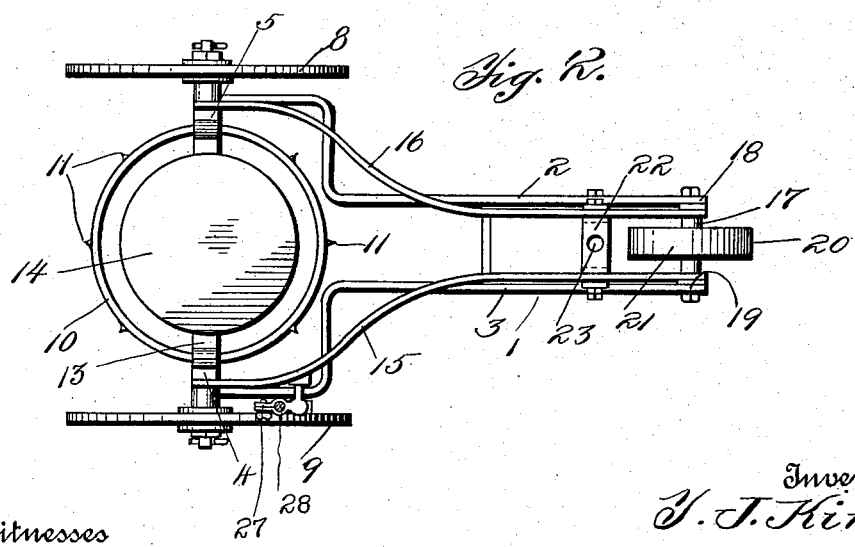
Witnesses
M. P. McKee
J. M. Bowie
Inventor
T. J. King
Alex. J. Wedderburn, Jr.
Attorney
COLUMBIA PLANOGRAPH CO., WASHINGTON, D. C.

T. J. KING.
TRUCK FOR COTTON PICKERS.
APPLICATION FILED JAN. 21, 1915.
1,166,463.
Patented Jan. 4, 1916.
2 SHEETS—SHEET 2.
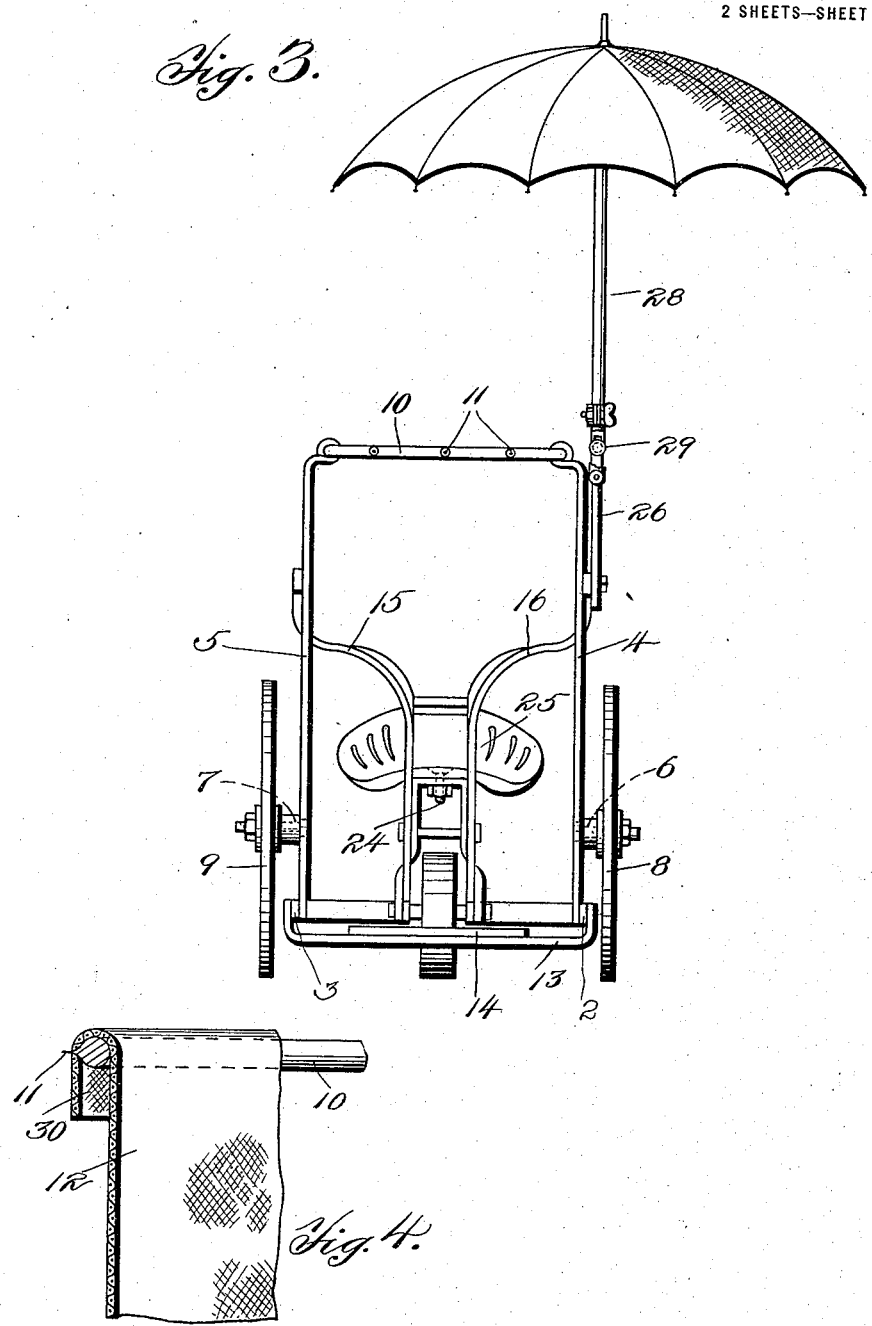
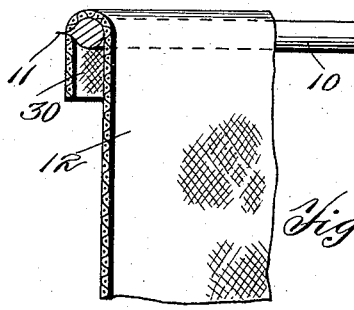
Witnesses
M. P. McKee
J. M. Bowie
Inventor
T. J. King
Alex. J. Wedderburn, Jr.
Attorney

UNITED STATES PATENT OFFICE.

THOMAS J. KING, OF RICHMOND, VIRGINIA.

TRUCK FOR COTTON-PICKERS.

1,166,463.  Specification of Letters Patent.  Patented Jan. 4, 1916.

Application filed January 21, 1915. Serial No. 3,596.

*To all whom it may concern:*

Be it known that I, THOMAS J. KING, a citizen of the United States, residing at Eleventh and Bank streets, Richmond, in the county of Henrico and State of Virginia, have invented certain new and useful Improvements in Trucks for Cotton-Pickers, of which the following is a specification.

This invention relates to improvements in a truck for cotton pickers and has for its object to provide a device for carrying and holding in an open position a bag to receive the picked cotton and a seat upon which the cotton picker may sit while picking cotton.

Another object of the invention is to provide a truck or cotton picker having a revoluble seat whereby the person seated thereon may readily shift his position without rising from the seat.

Still another object of the invention is to provide a truck supporting a sack and the person, the truck being propelled by the contact of the feet of said person with the ground.

With the above and other objects in view which will be more fully explained farther on, I have invented the device illustrated in the accompanying drawings, in which—

Figure 1 is an elevational view of my invention shown as in use, Fig. 2 is a top plan view of the device and seat having been moved therefrom, Fig. 3 is a front elevational view of the device, and Fig. 4 is an enlarged detail fragmental portion of a sack supporting means.

Like reference characters indicate like parts throughout the specification and in the several views in the drawings in which—

1 is a horizontal frame reduced in width at its rear and intermediate portions consisting of a pair of similarly formed members 2 and 3 each of which has an upright 4 and 5 supported by the axles 6 and 7 upon which are mounted forward wheels 8 and 9, the uppermost portion of the uprights 4 and 5 having fixed thereto a hoop or ring 10 provided with a plurality of pins 11 which are adapted to project through the fabric of which the sack 12 is made. The uprights 4 and 5 are separated far enough to conveniently permit the sack filled with cotton to rest therebetween. Directly under the ring 10 and mounted on the brace 13 is a platform 14 upon which the bottom end of the sack 12 is adapted to seat. Inclined braces 15 and 16 connect the upper portion of the uprights 4 and 5 with the axle 17, mounted at the extreme rear ends 18 and 19 of the frame members 2 and 3. The axle 17 carries a relatively small wheel 20 having a tread 21 considerably wider than the tread of the wheels 8 and 9 as the bulk of the weight of a cotton picker rests upon this wheel. Mounted near the wheel 20 upon the frame members 2 and 3 is a support 22 having an opening 23 adapted to receive the pin 24 of the seat 25 whereby said seat is revoluble upon said support 22. Mounted upon the member 16 is an umbrella support 26 having a clamp 27 for engaging an umbrella staff 28, the member 26 being provided with a universal joint 29 whereby the umbrella may be inclined to any desirable position. The sack 12 is adapted to project through the ring 10 and its edge 30 is folded over said ring so as to engage said points 11 whereby the sack is held in place and held open to receive the cotton. By having the seat revoluble the cotton picker may readily turn from one plant to another and from a row of plants on one side of said truck to the row of plants on the other side of the truck without rising from his seat, he may propel the truck simply by shoving against the ground with his feet or may straddle the frame work and may propel the truck by shoving from both sides.

Having now described my invention that which I claim to be new and desire to procure by Letters Patent is:—

1. A device of the kind described comprising opposing wheels, an axle mounted on each wheel, upright supports mounted on said axles, means at the upper end of said supports for suspending a bag, means at the lower end of said supports for supporting the bottom of said bag, a frame extending rearwardly from said support and connected thereto, and a wheel carried by said frame.

2. A device of the kind described comprising a horizontal frame, opposing uprights connected to said frame, a bag supported between said uprights, an umbrella supported laterally of said bag, wheels mounted alongside said bag having their axles above said horizontal frame, and a wheel trailing at the end of said horizontal frame opposite with respect to said bag support.

3. A device of the kind described comprising a frame, two wheels connected to said frame at one end, a single wheel carried by said frame at its opposite end, upright supports connected to said frame between said first-named wheels, means for suspending a bag between said upright supports, and means for steadying the under side of said bag.

4. A device of the kind described comprising a horizontal frame, a pair of wheels having short axles, a pair of uprights supported upon said axles, said frame being secured to and between said uprights, a trailing wheel carried by said horizontal frame at its rear end, a bag sustaining ring carried at the upper end between said uprights, and a bottom support for said bag carried by said horizontal frame.

5. A device as described consisting of a horizontally disposed frame, an upright frame and an oblique frame, all of said frames being secured together, large wheels mounted at the forward end of said horizontal frame, a small trailing wheel mounted at the opposite end of said horizontally disposed frame, and a bag sustaining support carried between said upright frame.

6. The described device consisting of a horizontal frame, bag supporting uprights connected to said frame, axles carried by said uprights and wheels mounted upon said axles, said frame being reduced in width toward its rear end and a trailer wheel mounted on said end, and an umbrella support carried by said device.

7. The described device consisting of a horizontal frame, bag supporting uprights connected to said frame, axles carried by said uprights and wheels mounted upon said axles, and a bag holding device mounted upon said uprights.

8. The described device consisting of a horizontal frame, a bag, supporting uprights connected to said frame, axles carried by said uprights and wheels mounted upon said axles, a bag holding device mounted upon said uprights, and a revolubly mounted seat supported above said frame.

In testimony whereof I affix my signature in presence of two witnesses.

THOMAS J. KING.

Witnesses:
E. J. SMITH,
M. M. GLENN.

Copies of this patent may be obtained for five cents each, by addressing the "Commissioner of Patents, Washington, D. C."